Oct. 11, 1960 P. F. SMITH 2,955,857
FLUID SEAL FOR ELECTRICAL CONNECTION JOINTS
Filed Oct. 14, 1957
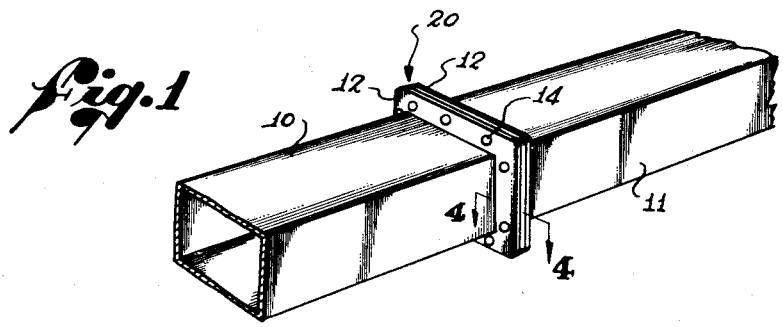
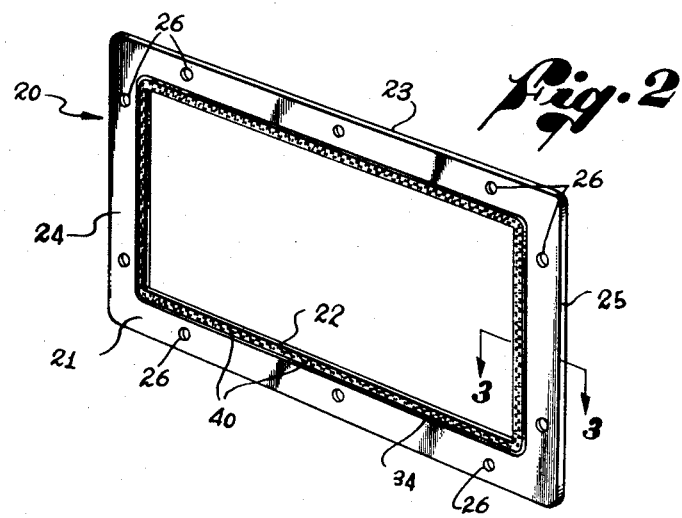
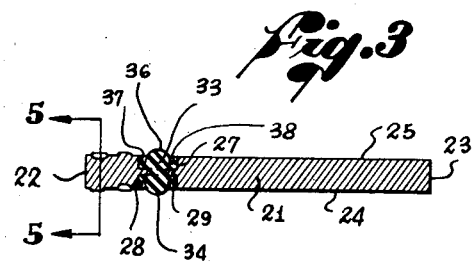
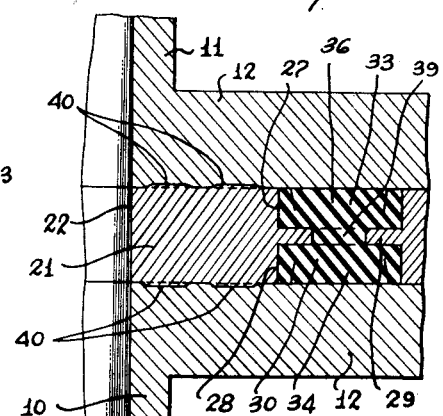
INVENTOR.
PAUL F. SMITH
BY *Fulwider Mattingly Huntley*
*Attorneys*

United States Patent Office 2,955,857
Patented Oct. 11, 1960

2,955,857
FLUID SEAL FOR ELECTRICAL CONNECTION JOINTS

Paul F. Smith, Pacific Palisades, Calif., assignor to Parker-Hannifin Corporation, Cleveland, Ohio, a corporation of Ohio Filed Oct. 14, 1957, Ser. No. 689,983

2 Claims. (Cl. 288—23)

This invention relates generally to a fluid seal adapted for use at a joint betwen mating parts, and more particularly to a seal of this kind which insures positive electrical connection between the parts.

An embodiment of the invention is especially advantageous for use in assembling wave guide transmission lines wherein high frequency electrical energy must be conveyed from one station to another without substantial transmission losses. In such installation it is conventional to provide wave guides formed as sectional lengths of sheet metal piping joined together end to end in the desired length and shape. Oftentimes the interior of the piping is pressurized with an inert gas, and in any event the interior must be sealed off from external contaminating fluids. This requires that the joints between pipe sections be sealed fluid tight.

It has also been found that there cannot be any discontinuity in the metal structure of the piping at the joints such as would cause a break in the electrical conductivity of the interior wall surface. If these breaks do occur they cause both attenuation and radiation losses of the electromagnetic wave energy and cannot be tolerated in a high energy level system. To meet these requirements it has been the practice to weld or solder the ends of the pipe sections together into a permanent joint which is not only time consuming and expensive, but has obvious disadvantages from a standpoint of service and repair. The present invention relates to a joint which can be easily connected or disconnected and yet solves the problem of both fluid sealing and electrical conductivity.

With the foregoing in mind it is therefore a major object of this invention to provide a fluid sealing device which may be placed in a joint between electrical conducting members and insures a positive electrical connection between the members around the entire circumference thereof.

It is also an object of the invention to provide a sealing device of the character described which may be easily installed and removed, it is reuseable, and will continue to provide a high pressure seal on each installation.

A further object of the invention is to provide electrical contact means which overcome any surface distortion or irregularities in the fit of the mating parts and insure positive connection.

Another object of the invention is to provide a sealing device which may be economically formed in a variety of different shapes for different installations.

These and other objects and advantages of the invention will become apparent from the following detailed description of a preferred form thereof, and from an inspection of the accompanying drawings in which:

Fig. 1 is a perspective view showing a typical joint in wave guide piping with the preferred form of seal installed therein;

Fig. 2 is a perspective view of the complete sealing device;

Fig. 3 is a cross section taken along the line 3—3 of Fig. 2;

Fig. 4 is a cross section taken along the line 4—4 of Fig. 1; and

Fig. 5 is an enlarged sectional detail taken along the line 5—5 of Fig. 3.

Referring now to the drawings and particularly to Fig. 1 thereof, a pair of hollow sheet metal pipes 10 and 11 are shown joined together end to end in a typical wave guide installation. The pipes 10 and 11 are of identical rectangular cross section, and each carries an enlarged end flange 12 which has a plurality of spaced holes to receive connecting fasteners or bolts by which the pipes may be joined together.

From a standpoint of high frequency electromagnetic energy, the interior wall of pipes 10 and 11 may be considered as a conduit for containing energy waves propagated through the interior open space, or the inner surface of the wall may be considered as a more conventional electrical conduit. In any event, the interior surface of the pipe walls is electrically charged and it has been found that any discontinuity or break in this wall surface creates attenuation and radiation losses in the transmitted energy. It is also to be understood, that the interior of pipes 10 and 11 is to be sealed either to prevent the escape of an internal pressurizing gas or to prevent the entrance of external contaminating fluids.

Interposed between the pipe flanges 12 is the preferred form of sealing device embodying the present invention designated generally by the numeral 20. As is best seen in Fig. 2, the device 20 has a retainer body 21 which is formed of suitable metal shaped into an open frame corresponding to the shape of flanges 12. Body 21 has an inner peripheral edge 22, and outer edge 23, and opposed side faces 24 and 25 Apertures 26 are spaced along body 21 to receive fasteners 14. The inner peripheral edge 22 of body 21 fits in exact alignment with the interior walls of pipes 10 and 11 and constitutes in effect an extension of these wall surfaces as is best seen in Fig. 4.

Formed in each of the opposed face surfaces 24 and 25 are continuous grooves 27 and 28, respectively, which are preferably in back-to-back relationship and are of rectangular cross section. The remaining material of body 21 between grooves 27 and 28 forms a solid web 29 which may be perforated at spaced points to provide connecting ports 30. Grooves 27 and 28 generally follow the path of peripheral edges 22 and 23 but have suitably radiused corners to avoid sharp turns at the corner of body 21.

Mounted within grooves 27 and 28 are packing members 33 and 34 respectively, which project therefrom and are adapted to make sealing contact with the pipe flanges 12. The packing members 33 and 34 are preferably molded in place in the grooves by the apparatus and with the configuration shown in Patent No. 2,717,793, entitled "Fluid Seal and Apparatus for Manufacture Thereof." Reference is made to the aforesaid patent for a complete description of the members 33 and 34, which may be briefly described as being formed of a resilient deformable material and having a central portion 36 which projects outwardly beyond the surface of faces 24 and 25. On each side of central portion 36 are void channels 37 and 38 which provide space into which the central portion may be deformed upon sealing engagement with flanges 12. This, of course, occurs as flanges 12 are drawn inwardly toward body 21 by tightening bolts 14. In accordance with the aforementioned packing members 33 and 34 may be connected together by integrally formed connectors 39 which extend through the parts 30 and are formed in the molding operation.

The volumetric relationship between packing members 33 and 34 and the grooves 27 and 28 is such that the packing members can be completely deformed within the grooves as is indicated in Fig. 4. Theoretically, this allows flanges 12 to make direct abutting engagement with the surfaces 24 and 25 over the entire area thereof, so that there would be absolutely no clearance between the flanges and body 21 around the entire periphery thereof.

However, the surfaces of flanges 12 may be slightly irregular or warped so that there is not an exact fit between surfaces 24 and 25 and the flanges around their entire periphery. The resulting clearance may be slight from a mechanical standpoint so that there is no interference with the sealing function of members 33 and 34, but still of sufficient order to provide an electrical gap in considering the continuity of the walls of pipes 10 and 11 and body 21.

To insure positive electrical conductivity between the pipes 10 and 11 and body 21, a series of contact means 40 are therefore formed integrally with body 21 in such a manner as to make positive electrical contact around the entire inner periphery of the body. These contact means 40 take the form of a series of small raised relatively sharp ridges which may be outstruck from the material of body 21, as is best seen in Fig. 5, and extend in closely spaced order in a continuous band around the inner portions of surfaces 24 and 25 close to the peripheral edge 22. As shown two bands of contacts 40 are provided, and as can be understood the exact arrangement of these contacts may vary considerably for different conditions and with different materials.

The distance which contacts 40 project above the surfaces 24 and 25 is small as compared to the projecting portions 36 of members 33 and 34. Thus, the packing members 33 and 34 are substantially deformed into full sealing engagement before there is any engagement between contacts 40 and the surfaces of flanges 12. Also, the contacts 40 are deformable into substantial alignment with the surfaces 24 and 25 in any portions of body 21 which, in fact, make a tight fit with the opposed flange surfaces. However, in those portions of the joint where some slight clearance would normally occur between body 21 and flanges 12, the contacts 40 bridge across the gap to provide electrical connection.

While I have thus described in some detail a preferred form of the invention, it is to be understood that considerable modification of the design and construction can be made without departing from the spirit of the invention. Therefore, I do not wish to be limited to the foregoing description except as is defined in the appended claims.

I claim:

1. In a joint between electrically conducting annular metal parts, said parts having an annular electrically conducting seal therebetween, the inner peripheries of said parts and said seal being aligned; said seal comprising a metallic retainer body having opposed part-engaging surfaces, each of said surfaces being provided with continuous circumferentially extending grooves therein, a resilient deformable packing member mounted in each of said grooves, each of said members having a portion projecting beyond said surface before assembly of said parts and said seal, each of said members, in the assembled joint, being deformed within said groove and in sealing engagement with one of said parts by being drawn thereagainst; said surfaces and said deformed packing members being substantially mating with and making direct abutting engagement with said parts over substantially the entire area thereof but in which irregularities and warping may provide gaps between said metallic body and said metallic parts, the improvement which comprises: a plurality of deformable, metallic, electrically conducting contacts integral with said body on each of said surfaces thereof and in a substantially continuous band on said surfaces adjacent the inner peripheral portion of said body, said contacts, before assembly to said parts and said seal, projecting beyond said part-engaging surfaces a distance less than the projection of said packing members, a portion of said contacts extending beyond said part-engaging surfaces and making contact with said parts where said gaps occur, and the remaining portion of said contacts being deformed into substantial alignment with said surfaces where said direct abutting engagement is achieved, whereby positive electrical connection between said parts is maintained.

2. In a joint between electrically conducting metal pipes having flanges, said flanges being annular and having an annular electrically conducting seal therebetween, the inner peripheries of said pipes, flanges, and seal being aligned; said seal comprising a metallic retainer body having opposed flange-engaging surfaces, each of said surfaces being provided with continuous circumferentially extending grooves therein in back-to-back relationship, a resilient deformable packing member molded in each of said grooves and having a volume no greater than that of said groove, each of said members having a portion extending beyond said flange-engaging surfaces before assembly of said pipes and said seal, each of said members, in the assembled joint, being deformed within said grooves and in sealing engagement with one of said flanges by being drawn thereagainst; said surfaces and said deformed packing members being substantially mating with and making direct abutting engagement with said flanges over substantially the entire area thereof but in which irregularities and warping may provide gaps between said metallic body and said metallic flanges, the improvement which comprises: a plurality of deformable, metallic, electrically conducting contacts integral with and spaced along said body on each of said surfaces thereof adjacent said packing members in a substantially continuous band on the inner peripheral portions of said surfaces, said contacts, before assembly of said flanged pipes and said seal, projecting beyond said flange-engaging surfaces a distance substantially less than the projection of said packing members, a portion of said deformable contacts extending beyond said flange-engaging surfaces and making contact with said flanges where said gaps occur, and the remaining portion of said contacts being deformed into substantial alignment with said surfaces where said direct abutting engagement is achieved, whereby positive electrical connection between said parts is maintained.

References Cited in the file of this patent

UNITED STATES PATENTS

| | | |
|---|---|---|
| 2,717,793 | Nenzell | Sept. 13, 1955 |
| 2,778,868 | Stinger | Jan. 22, 1957 |